UNITED STATES PATENT OFFICE.

CLAUDE G. MINER, OF BERKELEY, CALIFORNIA, ASSIGNOR TO THE MINER CHEMICAL CORPORATION, OF SAN FRANCISCO, CALIFORNIA, A CORPORATION OF NEVADA.

PROCESS OF RECOVERING ALUMINA.

1,324,318.  Specification of Letters Patent.  Patented Dec. 9, 1919.

No Drawing.   Application filed December 19, 1917.  Serial No. 207,902.

*To all whom it may concern:*

Be it known that I, CLAUDE G. MINER, a citizen of the United States, residing at Berkeley, in the county of Alameda and State of California, have invented certain new and useful Improvements in Processes of Recovering Alumina, of which the following is a specification.

In certain processes of decomposing aluminous silicates, including such aluminum-potassium silicates as the potash-bearing feldspars, leucite, sericite and the like, there are produced alkaline solutions consisting essentially of the silicates and aluminates of the alkali metals, together with alkali metal-hydroxids or carbonates or both. The present invention relates primarily to methods of treating such solutions in order to recover the alumina substantially uncontaminated by silica. The invention comprises also a process of treating aluminous silicates to form solutions of the character indicated above.

I have found that whereas both the aluminates and silicates of the alkali metals are readily maintained in admixture with each other in solution in water in presence of a sufficient proportion of caustic alkali, yet if this mixed solution be carbonated, either by the introduction of carbon dioxid or of an alkali metal bicarbonate, it is possible to effect a commercially complete precipitation of the alumina while maintaining the silica in solution. This separation can be carried out only at elevated temperatures, and the solution containing the alkali metal silicate but substantially freed from alumina is subsequently treated for the recovery of silicic acid and its contents of alkali.

Following is an illustrative example of my process as applied to the recovery of alumina and silica from aluminous silicates:—

The finely comminuted silicate, preferably ground to about 200 mesh, is intimately mixed with about twice its weight of an alkali metal carbonate, and the mixture is brought to the sintering temperature in any suitable furnace. The sintered mass is again crushed and mixed with a weight of water approximately equal to that of the original silicate. To this water, either before or after its addition to the charge, is added sufficient alkali metal hydroxid to prevent the aluminate from decomposing, or in other words, to keep the alumina in solution. This operation may be carried out at normal or higher temperatures, or even under pressure of steam, the solution taking place more rapidly at the higher temperatures.

The resulting solution is now separated from the undissolved residue by filtration or otherwise, and the latter is washed to free it from alumina. The solution thus obtained carries substantially all of the alumina of the original silicate in the form of alkali metal aluminate, together with a greater or less proportion of the silica, according to the conditions under which the solution was prepared. This aluminate solution is treated for the separation and recovery of alumina in a manner hereinafter described.

The residue from which the aluminate solution was separated contains any undissolved alkali metal silicate, and is further digested with caustic alkali to bring this silicate into solution. This is preferably accomplished by heating the residue with the caustic alkali solution in an autoclave under a considerable pressure of steam, preferably about 60–100 pounds. This yields a solution of alkali metal silicate from which the silica may be precipitated in any desired way, as for example by treating the solution with lime, or by carbonating it.

Instead of sintering the ore with the alkali metal carbonate as above described, an alkali metal hydroxid may be substituted for the carbonate and the mixture treated directly in the autoclave, the procedure in this case being substantially as described in my copending application Serial No. 207,901, filed December 19, 1917. For example 1000 parts of the silicate may be digested in the autoclave with 2250 parts of potassium hydroxid and 1375 parts of water, a temperature corresponding to 75–100 pounds pressure of steam being maintained for about one hour. This procedure yields a solution consisting essentially of the alkali metal aluminate and silicate, and caustic alkali.

However the aluminate solution may be prepared, it is next carbonated at an elevated temperature, preferably approximating the boiling-point. This carbonatation may be accomplished either by the direct use of carbon dioxid, or preferably by the addition of an alkali metal bicarbonate in sufficient proportion to convert the caustic alkali present into the normal carbonate:—

$$2KOH + CO_2 = K_2CO_3 + H_2O;$$

or $$KOH + HKCO_3 = K_2CO_3 + H_2O.$$

This reaction causes the immediate precipitation of practically the whole of the alumina-content of the solution in the form of aluminum hydroxid, from which the hot solution is at once filtered off. In the presence of sufficient alkali metal carbonate, and at a sufficient temperature, the silicic acid is practically wholly retained in solution, and may thus be separated from the alumina. A tendency to the precipitation of silica at this stage indicates a deficiency of alkali metal carbonate.

Although the above operation may be carried out at atmospheric pressures, I prefer to effect the precipitation of the alumina under superatmospheric pressure in an autoclave. For this purpose steam pressures up to 125 pounds per square inch may be used, with corresponding temperatures.

The hot solution of silicic acid in potassium carbonate is now permitted to cool, whereupon the bulk of the silicic acid separates in suitable form for recovery. This may be facilitated by further additions of carbon dioxid or alkali metal bicarbonate. The alkali metal carbonate solution is filtered from the silicic acid, and further treated in any desired manner. For example, any residual silicic acid may be precipitated by lime, simultaneously with the causticizing by lime of the carbonate solution. The alkali metal carbonate or hydroxid thus obtained is directly available for use in a repetition of the process.

In case the process is applied to potash-bearing silicates, I prefer to decompose the silicate by means of potassium compounds (carbonate or hydroxid), although the corresponding sodium compounds may be used for this purpose. For the treatment of aluminous silicates either the potassium or sodium compounds are applicable.

I claim:—

1. In a process of recovering alumina from silicates, the step which consists in carbonating a solution containing alkali metal aluminate and silicate at a sufficient temperature to effect precipitation of alumina while maintaining the silica in solution.

2. In a process of recovering alumina from silicates, the step which consists in carbonating a solution containing alkali metal aluminate and silicate under superatmospheric pressure and at a sufficient temperature to effect precipitation of alumina while maintaining the silica in solution.

3. In a process of recovering alumina from silicates, the step which consists in carbonating a solution containing alkali metal aluminate and silicate at a sufficient temperature to effect precipitation of alumina while maintaining the silica in solution, and then precipitating the silica at a lower temperature.

4. In a process of recovering alumina from silicates, the step which consists in carbonating a solution containing alkali metal aluminate and silicate under superatmospheric pressure and at a sufficient temperature to effect precipitation of alumina while maintaining the silica in solution, and then precipitating the silica at a lower temperature.

5. In a process of recovering alumina from silicates, the step which consists in carbonating a solution containing alkali metal aluminate and silicate by means of an alkali metal bicarbonate at a sufficient temperature to effect precipitation of alumina while maintaining the silica in solution.

6. In a process of recovering alumina from silicates, the step which consists in carbonating a solution containing alkali metal aluminate and silicate by means of an alkali metal bicarbonate under superatmospheric pressure and at a sufficient temperature to effect precipitation of alumina while maintaining the silica in solution.

7. In a process of recovering alumina from silicates, the step which consists in carbonating a solution containing alkali metal aluminate and silicate by means of an alkali metal bicarbonate at a sufficient temperature to effect precipitation of alumina while maintaining the silica in solution, and then precipitating the silica at a lower temperature.

8. In a process of recovering alumina from silicates, the step which consists in carbonating a solution containing alkali metal aluminate and silicate by means of an alkali metal bicarbonate under superatmospheric pressure and at a sufficient temperature to effect precipitation of alumina while maintaining the silica in solution, and then precipitating the silica at a lower temperature.

9. Process of decomposing aluminous silicates comprising sintering a comminuted silicate with an alkali metal carbonate, digesting the product with sufficient caustic alkali to dissolve the alumina, and then precipitating the alumina by carbonating the solution at a sufficient temperature to avoid substantial precipitation of silica.

10. Process of recovering alumina and silica from alkaline solutions thereof consisting in carbonating said solutions and thereby separately precipitating alumina and silica therefrom at successively higher and lower temperatures.

11. Process of recovering alumina and silica from alkaline solutions thereof consisting in carbonating said solutions by means of an alkali metal bicarbonate, and thereby separately precipitating alumina and silica therefrom at successively higher and lower temperatures.

In testimony whereof, I affix my signature.

CLAUDE G. MINER.